July 24, 1951  E. F. GUILLOT  2,561,362
ADHESIVE SHEET AND METHOD OF MAKING SAME
Filed Feb. 14, 1948
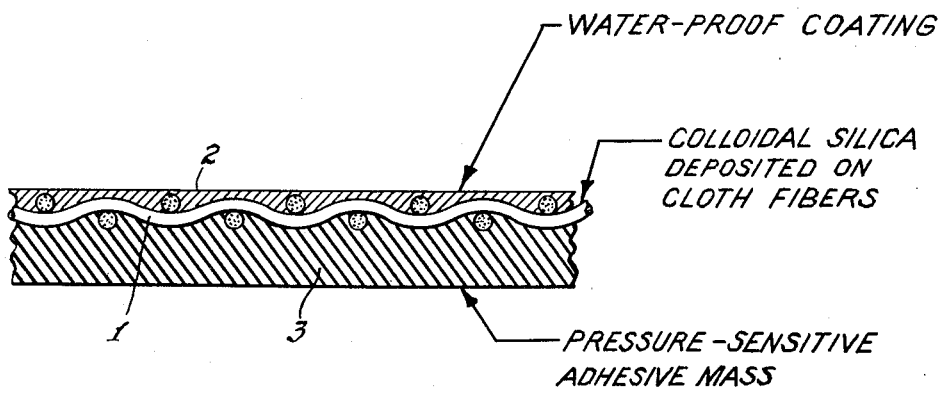
INVENTOR
EDGAR F. GUILLOT
BY
ATTORNEY Patented July 24, 1951

2,561,362

UNITED STATES PATENT OFFICE 2,561,362

ADHESIVE SHEET AND METHOD OF MAKING SAME

Edgar Frank Guillot, Bloomfield, N. J., assignor to Johnson & Johnson, a corporation of New Jersey Application February 14, 1948, Serial No. 8,347

7 Claims. (Cl. 117—68.5)

1

This invention relates to adhesive tapes or sheets, particularly of the type used for surgical adhesive tape.

Such pressure-sensitive tapes or sheets usually consist of a suitable backing or support, for example, cotton cloth, to the front face of which is bonded a thin layer of a pressure-sensitive and normally tacky mass, that is, an adhesive mass which adheres to the desired surface merely by being pressed gently against it and requires neither activation nor setting as by heating, wetting, drying, or otherwise, to establish adhesion. Such pressure-sensitive masses must be permanently tacky in order to adhere adequately to the desired surface and in order to be reusable. They must have adequate cohesive strength, or strength of the adhesive mass itself, to produce the required adhesion between the support or backing sheet and the surface to which the tape is applied. In addition, the bond to the support and the cohesive strength of the mass must each be greater than the adhesion established between the mass and the surface to which the tape is applied in order that the tape may be cleanly removed after application. As a specific example of this latter property, the cohesive strength of the mass and its bond to the support must each be stronger than any adhesion which is established between the adhesive mass and the back face of the tape when the tape is rolled up. Otherwise the tape could not be unrolled in condition to be used.

The adhesive mass is usually of the type having an elastomeric base, a plasticizer, a tackifier, and a filler. The elastomeric base may be natural rubber or any of a wide variety of organic synthetic rubber compounds or organic rubber type elastomers not hard rubber. The tackifier may be rosin or a similar resin. The plasticizer may be any suitable rubber plasticizer, such as light mineral oil. The filler may be any suitable filler or extender, for example, zinc oxide or titanium oxide. These ingredients are well known and their selection and proportion are matters of choice. The ingredients may be compounded on a rubber mill of known type and spread on a cloth sheet by means of the usual calender. Frequently the cloth backing has a water resistant and impervious coating applied to the back face as shown in the patent to Mathey and Slotter, No. 1,877,344, to retard soiling of the tape and to make it water resistant in use. Frequently tapes of this character have to be sterilized by exposure to temperatures of 230°–240° F. for periods of 25 to 30 min. and they must retain

2 their characteristics throughout this sterilization process and for long periods thereafter in order that they may be distributed in commerce, stored in the usual course of distribution, and remain usable.

In making adhesive tapes of the character described, and especially in making tapes with waterproof or impervious coatings difficulty has been experienced in calendering the adhesive mass on the tape. It has been difficult to secure a sufficient bond between the adhesive mass and the front face of the cloth. As a consequence, when the tape is applied to some surfaces, or when the tape is rolled up, the adhesion established with such surfaces or with the back of the tape has been stronger than the bond between the mass and the front face of the cloth, so that when an attempt is made to remove the tape after using, the adhesive mass leaves the front side of the cloth and remains adhered to the surface to which it has been applied. While it has been possible by careful selection of ingredients and careful compounding to produce reasonably satisfactory tapes using cloth which has not been waterproofed, it has been extremely difficult and impractical in manufacturing operations to anchor satisfactorily the adhesive mass on waterproofed cloth. The difficulty has been especially aggravated with synthetic rubber adhesive masses. The reasons for this are not known but it is believed that the relative absence of proteins and other well dispersed hydrophilic materials in synthetic rubber and the relative uniformity and lack of adhesion in synthetic rubber causes the anchoring difficulty. Accordingly, it is an object of the invention to provide an improved adhesive tape, and particularly a waterproofed tape having a natural and/or synthetic elastomeric base for the adhesive mass, in which the adhesive mass is adequately anchored to the cloth backing, and to provide a process for making such adhesive tape.

This invention is based upon the discovery that adhesive masses using natural and/or synthetic rubber as the elastomeric base can be anchored or bonded adequately and satisfactorily to cloth backings, even when such backings are waterproofed by an impervious film, by coating the fibres of the cloth with a dispersion of finely divided silica in which the size of the particles is prevented from growing in the dispersed state beyond six microns. In other words, the silica in such dispersion, while it may polymerize or agglomerate to some extent (both of which phenomena are herein referred to collectively as polymerization) is so stabilized that polymerization ceases before the size of the particle, growing in such polymerization, reaches six microns.

The types of silica used in accordance with the invention are distinguished from other types of what is known under the generic name of "colloidal silica," which polymerizes readily and progressively in dispersions to form a tightly bound highly polymerized network. Continuous polymerization of this type of dispersed silica accounts for the progressive gelation even of dispersions having low initial concentrations and viscosities. Types of colloidal silica that polymerize progressively in dispersions form agglomerized particles which do not anchor sufficiently to either a fibrous backing or an elastomer based adhesive to improve the anchorage of such an adhesive to a backing.

The stable, finely divided, micellar silica employed in accordance with the invention consists of micellae considered to be tightly packed with individual silica fibres, which may be polymerized to some extent from their original nearly monomolecular state, but that are stabilized by any of the methods of the prior art to prevent the particle size in the dispersion exceeding six microns. In preferred forms of the invention the micellar silica used is substantially pure and non-abrasive, and has a slightly negative charge. The silica employed in such preferred forms of the invention has no added dispersing agent present but a "solvated hull" is believed to be formed around the surface of the particles.

Micellar silica that is stabilized at a particle size of less than six microns may be made, for instance, by the process disclosed in White Patent 2,375,738 issued May 8, 1945. In accordance with that patent an aquagel of silica is first prepared by reacting an acid with a water-soluble silicate, washing the resulting gel of one to fifteen percent silica concentration with water or another suitable solvent to remove the electrolytes formed during the reaction, covering the gel with a weak aqueous solution of a substance capable of forming hydroxyl ions, and, after removing the gel from the solution, heating it while avoiding evaporation of water, until substantially all of the gel is converted to a sol. Instead of the aqueous silica dispersion product discussed above, equivalent organic dispersions may be used which may, for instance, be obtained by conversion with a water-miscible organic solvent, as shown in the White patent.

The important feature of the product of the White patent for purposes of the present invention appears to be that the particles obtained in accordance with the process therein are usually very finely divided, of a size not far removed from the size of the molecule, and that these particles are covered with a hull including hydroxyl ions contributed by the above-mentioned "substance capable of forming hydroxyl ions." Among substances capable of forming hydroxyl ions and of contributing such ions to the "solvated hull" of the particle are caustic soda, caustic potash, sodium or potassium, phosphate, trisodium phosphate, tripotassium phosphate and hydroxides of the alkaline earth metals, such as calcium or barium hydroxide. Any of these or combinations of these may be used in extremely weak solutions, for instance, in 0.03 to 0.50% solutions of caustic soda. It appears that the products used by applicant in his invention have particles of a shape that is different from particles in ordinary silica gels or "colloidal silica." There is evidence that the particles of the silica of the invention are well adapted to embed themselves mechanically and to contribute in the formation of the adhesive bond.

The types of silica that are in a state of arrested partial polymerization may normally be dispersed as stable spherical micellae having an average particle diameter of preferably one-fiftieth to one-tenth of a micron and having absorbed hydroxyl ions and a solvated hull at the surface. Commercial types of such silica products are made by the Monsanto Chemical Company of St. Louis, Missouri, under the name of "Syton" and have a very small negative charge except below their isoelectric point that may be near a pH of two.

The single figure of the accompanying drawing is an enlarged section of an adhesive tape embodying the invention. The invention is applied to any suitable or conventional adhesive tape, including a woven cotton tape 1 having a water-resistant impervious film 2 applied to its back face and a pressure-sensitive adhesive film 3 applied to its front face. The waterproof film may be of any suitable or known material and may be applied in any suitable manner, for example, as disclosed in the Mathey and Slotter patent. The adhesive mass or film may be of any suitable or known formula and may be applied to the front face of the tape in any suitable manner, e. g., by calender. Prior to the application of the adhesive mass and either before or after the application of the waterproof film, the cloth backing is dipped or passed through a dispersion which deposits the above described silica and is dried in any suitable manner, as by passing through a tenter.

Silica of the above-described types may be deposited on the fibres from any of a number of dispersions or systems. One suitable system is a dispersion of preferably 0.3–3% of micellar silica having an average particle diameter in the range of one-fiftieth to one-tenth of a micron. The dispersion is preferably heated to approximately 180° F. before and during application and finely divided silica is thus deposited on the surfaces of the fibres. After drying of the treated fabric the adhesive may be applied by calendering, by any other hot melt process or in any other desired manner.

It has been found that the improvement is especially effective in promoting an adequate bond between the cloth and those adhesive masses in which the elastomeric base is a synthetic polymer, although the presence of the type of silica discussed herein also aids materially in bonding adhesive masses made from natural rubber. Moreover, this type of silica improves the bonding of both types of adhesive masses to uncoated cloth backings, as well as coated cloth backings, although the improvement is most marked in the case of coated cotton cloth backings. The presence of the silica described herein does not adversely affect the feel or appearance of the cloth, the most noticeable difference being an improvement in the ease with which the mass is applied and a strengthening of the adhesive bond between the mass and the cloth.

This application is a continuation in part of Guillot application, Serial No. 589,120, filed April 19, 1945, now abandoned.

The claims are:

1. The method of making adhesive tapes or sheets which comprises depositing silica on the fibres of a fibrous support and thereafter applying a pressure-sensitive, normally tacky and reusable adhesive film to said support, said silica being deposited from a dispersion characterized by stable particles having a size of less than six microns and comprising silica in an arrested state of polymerization.

2. The method of making adhesive tapes or sheets which comprises depositing silica on the fibres of a fibrous support, drying said support, and thereafter applying a pressure-sensitive, normally tacky and reusable adhesive film to said support, said silica being deposited from dispersion characterized by silica particles having average diameters of between one-fiftieth to one-tenth of a micron said silica being in an arrested state of polymerization and said particles having solvated hulls containing hydroxyl ions.

3. The method of making adhesive tapes or sheets which comprises depositing silica on the fibres of a fibrous support, drying said support, and thereafter applying a pressure-sensitive, normally tacky and reusable adhesive film to said support, said silica being deposited from an aqueous dispersion characterized by silica particles having a size of less than six microns said silica particles being in an arrested state of polymerization.

4. An adhesive tape or sheet comprising in combination a support of fibrous material the fibers of which are coated with stable, finely divided micellar silica particles having a particle size not greatly exceeding six microns and having the characteristics of silica particles deposited from a dispersion of silica particles in an arrested state of polymerzation and having an average particle diameter within the range of about one-fiftieth to one-tenth of a micron, a pressure-sensitive, normally tacky adhesive coating secured to one face of said silica-coated support and a waterproof coating attached to the opposite face of said support.

5. An adhesive tape or sheet comprising in combination a support of fibrous material the fibers of which are coated with stable, finely divided micellar silica particles having a particle size not greatly exceeding six microns and having the characteristics of silica particles deposited from a dispersion of silica particles in an arrested state of polymerization and having an average particle diameter within the range of about one-fiftieth to one-tenth of a micron and having solvated hulls on the particles said hulls comprising hydroxyl ions, and a pressure-sensitive, normally tacky adhesive film comprising a synthetic elastomer secured to said silica-coated support.

6. An adhesive tape or sheet comprising in combination a support of fibrous material the fibers of which are coated with stable, finely divided micellar silica particles having the characteristics of silica particles deposited from an aqueous dispersion of silica particles in an arrested state of polymerization and having an average particle diameter within the range of about one-fiftieth to one-tenth of a micron, and a pressure-sensitive, normally tacky adhesive film secured to said silica-coated support.

7. An adhesive tape or sheet comprising in combination a cotton support the fibers of which are coated with stable, finely divided micellar silica particles, said particles having the characteristics of silica particles deposited from a dispersion of silica particles in an arrested state of polymerization, and having a particle size of not more than six microns, and a pressure-sensitive, normally tacky adhesive film containing an elastomer secured to said silica-coated cotton support.

EDGAR FRANK GUILLOT.

REFERENCES CITED

The following references are of record in the file of this patent:

UNITED STATES PATENTS

| Number | Name | Date |
| --- | --- | --- |
| 1,877,344 | Mathey et al. | Sept. 13, 1932 |
| 2,317,436 | Boller | Apr. 27, 1943 |
| 2,356,354 | Rodman | Aug. 22, 1944 |
| 2,375,738 | White | May 8, 1945 |
| 2,380,775 | Meyer | July 31, 1945 |
| 2,433,515 | Jahoda | Dec. 30, 1947 |

FOREIGN PATENTS

| Number | Country | Date |
| --- | --- | --- |
| 413,407 | Great Britain | July 19, 1934 |